United States Patent [19]

Hesse et al.

[11] Patent Number: 5,287,542
[45] Date of Patent: Feb. 15, 1994

[54] METHOD TO EXPAND AN AUDIENCE IN A COMMUNICATION SYSTEM NETWORK

[75] Inventors: Gregory N. Hesse, Hanover Park; John W. Maher, Woodstock, both of Ill.

[73] Assignee: Motorola, Inc., Schaumburg, Ill.

[21] Appl. No.: 841,696

[22] Filed: Feb. 26, 1992

[51] Int. Cl.$^5$ .............................................. H04B 7/00
[52] U.S. Cl. .................................. 455/13.1; 455/15; 455/34.1; 455/53.1; 455/54.2; 455/56.1; 455/78
[58] Field of Search ................ 455/13.1, 15, 33.1, 455/34.1, 49.1, 53.1, 54.2, 56.1, 57.1, 67.1, 78, 89

[56] References Cited

U.S. PATENT DOCUMENTS

| | | | |
|---|---|---|---|
| 4,012,597 | 3/1977 | Lynk, Jr. et al. | 455/34.1 |
| 4,646,345 | 2/1987 | Zdunek et al. | 455/34.1 |
| 4,926,496 | 5/1990 | Cole et al. | 455/34.1 |
| 5,025,254 | 6/1991 | Hess | 455/34.1 |
| 5,159,701 | 10/1992 | Barnes et al. | 455/15 |

Primary Examiner—James L. Dwyer
Assistant Examiner—Timothy H. Keough
Attorney, Agent, or Firm—Timothy W. Markison

[57] ABSTRACT

A central controller of a communication system network may more efficiently expand an audience of a communication in the following manner. When a communication unit of a first communication group within a first communication system transmits a request for service, the central controller determines whether the audience of that predetermined communication is to be expanded. When the audience of the predetermined communication is to be expanded, the central controller combines at least part of at least one other communication group with the first communication group based upon a predetermined grouping arrangement. Having combined the groups, the central controller processes the predetermined communication among the communication units in the first communication group and the communication units in the at least part of the least one other communication group.

4 Claims, 2 Drawing Sheets

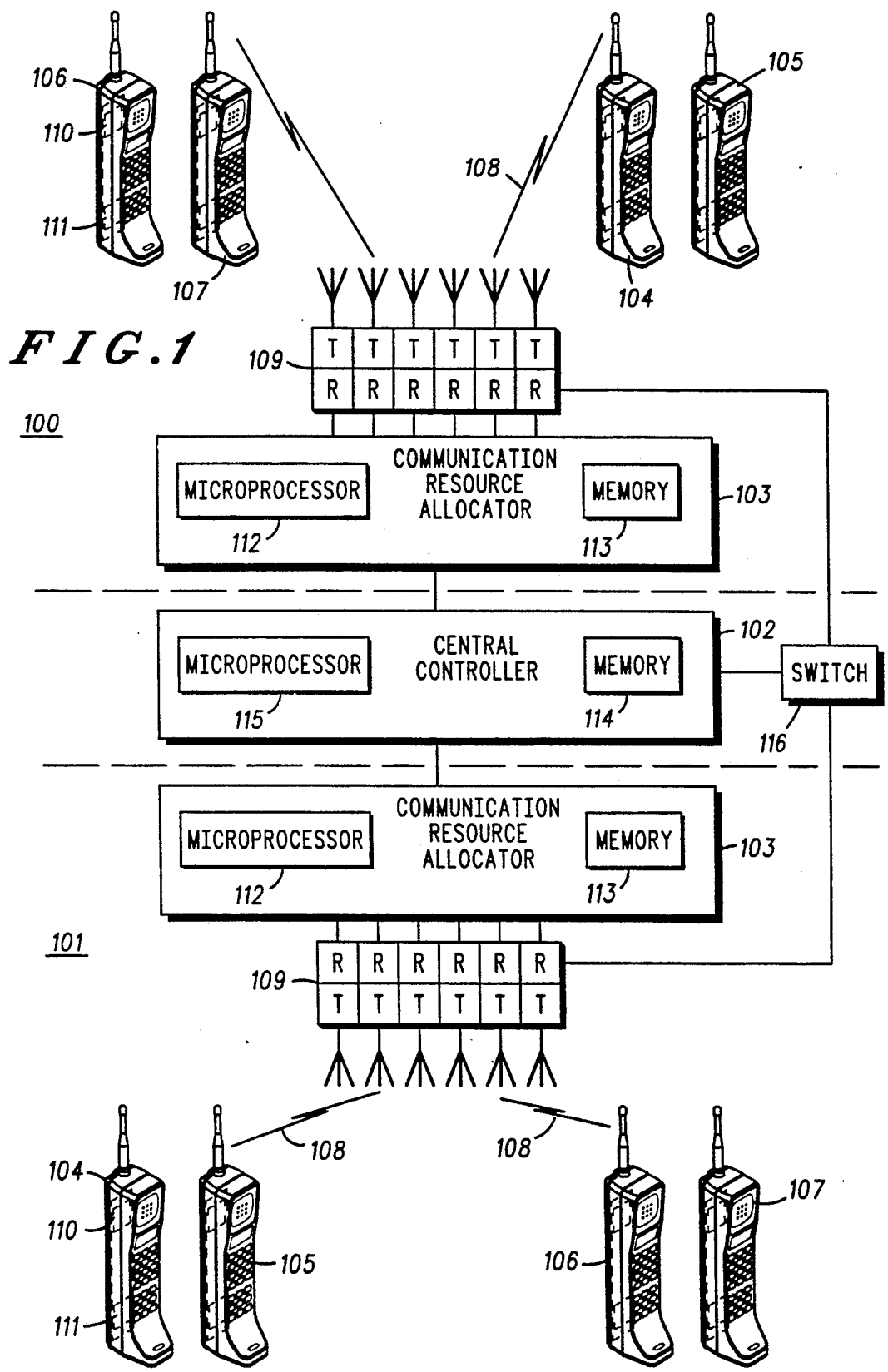

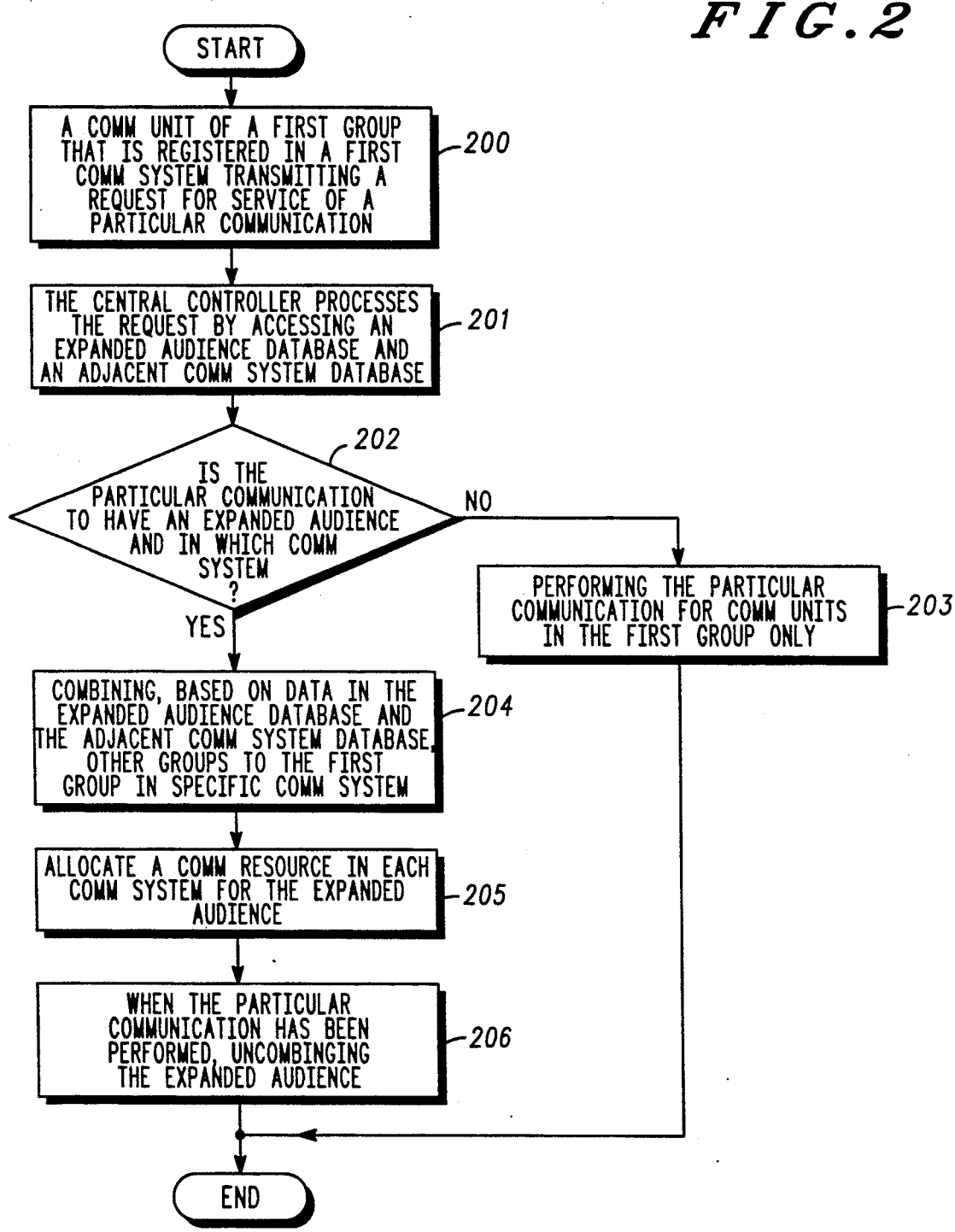

METHOD TO EXPAND AN AUDIENCE IN A COMMUNICATION SYSTEM NETWORK

FIELD OF THE INVENTION

This invention relates generally to communication system networks and in particular to a method that expands an audience of a predetermined communication.

BACKGROUND OF THE INVENTION

Communication system networks are known to comprise a plurality of communication systems and a central controller. Each of the communication systems comprises a plurality of communication units, a limited number of communication resources that are transceived via a limited number of repeaters, and a communication resource allocator that allocates the communication resources among the plurality of communication units. The communication units, which may be mobile radios, portable radios, and/or portable radio/telephones, are typically arranged in to communication groups and are generally located throughout the communication system network. Of the communication resources, which may be TDM slot locations, frequency carriers, pair of frequency carriers, or any other RF transmission means, one is selected to function as a control channel. The control channel transceives operational information between the communication units and the central controller via the communication resource allocators.

As is known, a communication unit may establish a communication with other communication units within the communication system network by transmitting an inbound signalling word (ISW) to the central controller via the communication resource allocator of the communication system that the communication unit is located in. Upon receiving the request, the central controller processes it and, if the request is valid, the central controller allocates a communication resource in each of the communication systems that have a communication unit of the targeted talk group in it. The communication systems, which may also be communication sites, are coupled to and controlled by the central controller. If a communication system, or site, loses contact with the central controller, the communication system, or site, operates as an independent communication system but only for communication units that are located within its coverage area.

As is also known, under certain circumstances, a communication group that does not normally communicate with another communication group may be combined such that the separate communication groups act as one. For example, in an emergency condition, the police communication group and the fire communication group may be combined into one to respond to a particular emergency. To process this, the central controller, when the emergency condition is initiated by a communication unit in either the police or the fire department communication group, allocates a communication resource in each of the communication systems, or sites, for the combined group. This type of broad regrouping may be inefficient when the particular emergency is occurring in a very localized area. For example, members of the fire department and police department may be located anywhere within the communication system network and be several tens of miles away from the area where the emergency is occurring. Thus, notifying these members of the combined communication group is unnecessary because these members are physically unable to respond to the emergency condition. Therefore, a need exists for a method that will allow the central controller to expand the audience, or regroup communication groups, to respond to predetermined communications but only in selected communication systems.

SUMMARY OF THE INVENTION

These needs and others are substantially met by the method to expand an audience in a communication system network as disclosed herein. In a network of communication systems that are operably coupled via a central controller, wherein each communication system includes a plurality of communication units that are arranged into communication groups, a limited number of communication resources that are transceived via a limited number of repeaters, and a communication resource allocator that allocates the limited number of communication resources among the plurality of communication units, the following describes a method that expands an audience of a predetermined communication. The process begins when a communication unit of a first communication group within a first communication system transmits a request for service of a predetermined communication to the central controller via the communication resource allocator of the first communication system. Upon receiving the request, the central controller processes the request to determine whether the audience of the predetermined communication is to be expanded. When the central controller determines that the audience is to be expanded, it combines at least part of at least one other communication group with the first communication group based on a predetermined grouping arrangement. Having expanded the audience, the central controller processes the predetermined communication among the communication units in the first communication group and the communication units in the at least part of the at least one other communication group.

BRIEF DESCRIPTION OF THE DRAWINGS

FIG. 1 illustrates a communication system network that may incorporate the present invention.

FIG. 2 illustrates a logic diagram that may be used to implement the present invention.

DESCRIPTION OF A PREFERRED EMBODIMENT

FIG. 1 illustrates a network of communication systems 100-101 (only two shown) that are operably coupled via a central controller 102. Each communication system comprises a communication resource allocator 103, a plurality of communication units (four shown) 104-107, a limited number of communication resources 108, and a limited number of repeaters 109. Each of the communication units 104-107, comprises at least one microprocessor 110 and a digital storage memory device 111 which may be RAM, ROM or any other type of means for storing digital information. The communication resource allocator 103 comprises at least one microprocessor 112 and a digital storage memory device 113 which may be RAM, ROM or any other type of means for storing digital information. Each of the communication resources 108 are transceived between the communication units 104-107 and the communication resource allocator 103 via the repeaters 109, wherein the repeaters may comprise base stations. The central controller 102 comprises at least one microprocessor 115 and a digital storage memory device 114 which may be RAM, ROM or any other type of means for storing digital information. The memory 114 comprising the central controller 102 contains, at least in part, an adjacent communication system database and an expanded audience database. The communication resources of one communication system may communicate to any other communication resource in any other communication system via a switch 116. Switch 116 may consists of a switch matrix or other means to route audio from one port to another as is known in the art.

In the network of communication systems, a communication unit can operate in any of the communication systems of the network. This is generally accomplished by the communication resource allocator of each communication system being able to communicate to each other. The communication resource allocators communicate via a hub computer network, or central controller 102, a technique which is well known in the art. The repeaters 109 in each communication system 100-101 are connected to a switch 116 which is under the control of the central controller 102. When a communication unit 104-107 desires to start a predetermined communication, it transmits an inbound signalling word (ISW) to the communication resource allocator 103 of the communication system in which it resides. The communication resource allocator 103 and central controller 102 process the ISW, as is known in the art, and allocate the communication unit a communication resource.

Having been allocated a communication resource, the communication unit may operate in this communication system. The communication unit may also communicate to other communication units in other communication systems by operably coupling communication systems through the switch 116. When the communication unit requests a predetermined communication, the audience of the communication unit is limited to a single communication group, i.e. the same communication group as that of the communication unit that requested the predetermined communication. The method of FIG. 2 allows the audience of the communication unit to be expanded to include additional communication groups and communication systems.

The central controller expands the audience of a predetermined communication by combining communication groups that are associated with the requesting communication group when a particular predetermined communication is requested by the use of an expanded audience database means. The expanded audience database contains, for each communication group, identification codes, as are well known in the art, of communication groups that are to be combined with a communication group when the predetermined communication is requested.

At step 200 of FIG. 2, a communication unit of a first group that is registered in a first communication system transmits a request for service of a particular communication. As discussed above, the request for service comprises transmitting an ISW to the communication resource allocator of that system, a technique well known in the art. The transmitted ISW contains the predetermined communication request which may be, for example, a request for an Emergency talkgroup call. After receiving the request, the communication resource allocator in the first communication system sends the request to the central controller.

Upon receiving the request, the central controller processes it by accessing an expanded audience database 201. The expanded audience database contains information that indicates which communication groups are to be combined for a particular predetermined communication request. Continuing with the example above, when a communication unit of communication group 1 initiates an emergency request, the central controller accesses the database to see that for an emergency request initiated by a communication unit in communication group 1, communication groups 2, 3, and 6 are to be combined. In addition to accessing the database, the central controller determines which communication system the request was initiated in based on which communication resource allocator conveyed the request. From this information, the central controller determines whether the particular communication is to have an expanded audience in step 202.

If the audience for this particular communication is not to be expanded, the communication request will be processed according to step 203 such that only the communication units in the first communication group will participate in this particular communication. The processing of communications for a communication group is well known in the art thus, no further discussion will be presented. If the audience for this particular communication is to be expanded, the central controller combines the communication groups based on the information retrieved from the expanded audience database 204. Having combined the expanded audience, the central controller accesses an adjacent system database 204. The adjacent system database contains information for each communication system regarding which communication systems, as distinguished by their communication system identification codes, as are well known in the art, are in close physical proximity (coverage area within 5 miles) to it.

Combining communication groups is well known in the art and can be done in at least two ways. The first approach is to allocate, in each communication system, a communication resource for each communication group. The second approach is to, for each communication group, regroup only those communication groups that have a communication unit registered in the communication system. This process is described in co-pending patent application entitled DYNAMIC GROUP REGROUPING METHOD, having the same filing date as this application.

Once the central controller determines the adjacent systems for the communication system, the central controller accesses a communication group/communication system database (step not shown, this technique is well known in the art). The communication group/communication system database contains, for each communication system, information that indicates which communication systems have at least one communication group registered in it. Thus, continuing with the example above, the central controller has already determined that the audience is to be expanded to include communication groups 1, 2, 3, and 6. Further, assume that the adjacent systems to communication system 1 are communication systems 2, 3, 4, 5, 6, and 7. From these parameters, the central controller determines, from the communication group/communication system database, whether a communication unit of the expanded audience is registered in communication systems 2, 3, 4, 5, 6, or 7.

If a communication unit of the expanded audience is registered in each of the communication systems, the central controller allocates a communication resource in each system for the expanded audience 205. If a communication system does not have a communication unit of the expanded audience registered in it, the central controller will not allocate a communication resource in that system 205. Communication units in a communication group of the expanded audience that are not in an adjacent communication system will not be part of the expanded audience, only those communication units in the adjacent systems will be able to participate in the expanded audience communication. Communication units may register in an adjacent system during the pendency of the expanded audience and be able to participate. Once the particular communication has been executed, the central controller ungroups the expanded audience and the process ends 206.

We claim:

1. In a network of communication systems that are operably coupled via a central controller, wherein each communication system includes a plurality of communication units that are arranged into communication groups, a limited number of communication resources that are transceived via a limited number of repeaters, and a communication resource allocator that allocates via the central controller the limited number of communication resources among the plurality of communication units, a method that expands an audience of a predetermined communication, the method comprises the steps of:

a) transmitting, by a communication unit of a first communication group within a first communication system, a predetermined communication request to the central controller via the communication resource allocator of the first communication system;

b) when the request is received by the central controller, accessing, by the central controller, an expanded audience database to determine communication groups that are to be combined with the first communication group based on the predetermined communication request to produce combined communication groups;

c) when the audience of the predetermined communication is to be expanded, accessing, by the central controller, an adjacent communication system database to determine communication systems that are adjacent to the first communication system to produce adjacent communication systems; and d) when the audience of the predetermined communication is to be expanded, combining, by the central controller, the combined communication groups but only in the adjacent communication systems such that only communication units in the first communication system and communication units in the adjacent sites of the combined communication groups participate in the predetermined communication.

2. In the method of claim 1, step (d) further comprises allocating a communication resource in each of the adjacent communication systems to the combined communication groups.

3. In the method of claim 1 step (d) further comprises allocating a communication resource in each of the adjacent communication systems to each communication group of the combined communication group.

4. In a network of communication systems that are operably coupled via a central controller, wherein each communication system includes a plurality of communication units that are arranged into communication groups, a limited number of communication resources that are transceived via a limited number of repeaters, and a communication resource allocator that allocates via the central controller the limited number of communication resources among the plurality of communication units, wherein the central controller is improved to comprise:

adjacent communication system database means for storing, for each communication system, identification codes of communication systems that are adjacent to a communication system;

expanded audience database means, for each communication group, storing identification codes of communication groups that are to be combined with a communication group when a particular predetermined communication occurs; and determination means, operably coupled to the adjacent communication system database means and expanded audience database means, for determining which communication groups to combine in particular communication systems.

* * * * *